(12) United States Patent
Abraham

(10) Patent No.: US 11,790,950 B2
(45) Date of Patent: Oct. 17, 2023

(54) FILM-MAKING USING STYLE TRANSFER

(71) Applicant: Robert Salem Abraham, Canadian, TX (US)

(72) Inventor: Robert Salem Abraham, Canadian, TX (US)

( * ) Notice: Subject to any disclaimer, the term of this patent is extended or adjusted under 35 U.S.C. 154(b) by 0 days.

(21) Appl. No.: 17/149,596

(22) Filed: Jan. 14, 2021

(65) Prior Publication Data

US 2021/0217443 A1 Jul. 15, 2021

Related U.S. Application Data

(60) Provisional application No. 62/961,117, filed on Jan. 14, 2020.

(51) Int. Cl.

| | |
|---|---|
| *G11B 27/02* | (2006.01) |
| *G06N 3/08* | (2023.01) |
| *H04N 21/8549* | (2011.01) |
| *G06F 16/738* | (2019.01) |
| *G11B 27/00* | (2006.01) |
| *G11B 27/036* | (2006.01) |
| *G11B 27/031* | (2006.01) |

(52) U.S. Cl.
CPC ............ *G11B 27/02* (2013.01); *G06N 3/08* (2013.01); *G06F 16/739* (2019.01); *G11B 27/00* (2013.01); *G11B 27/031* (2013.01); *G11B 27/036* (2013.01); *H04N 21/8549* (2013.01)

(58) Field of Classification Search
USPC ....................................... 386/241, 248, 278
See application file for complete search history.

(56) References Cited

U.S. PATENT DOCUMENTS

| | | | | |
|---|---|---|---|---|
| 10,311,913 B1* | 6/2019 | Shekhar | ................. | G06K 9/623 |
| 10,643,303 B1* | 5/2020 | Cotoros | ............. | H04N 5/23218 |
| 10,685,057 B1* | 6/2020 | Chavez | ............... | G06F 16/9535 |
| 10,777,228 B1* | 9/2020 | Wilson | .................. | G11B 27/02 |

(Continued)

OTHER PUBLICATIONS

Badenas et al., "Motion-based Segmentation and Region Tracking in Image Sequences," Pattern Recognition, Mar. 2001, 34(3):661-670 (abstract only).

(Continued)

*Primary Examiner* — Nigar Chowdhury
(74) *Attorney, Agent, or Firm* — Fish & Richardson P.C.

(57) ABSTRACT

Methods, systems, and apparatus, including computer programs encoded on computer storage media, for film-making using style transfer. One of the methods includes receiving an initial video comprising a sequence of initial video frames; receiving a selection of style images; for each initial video frame in the sequence of initial video frames, processing the initial video frame to generate a final video frame, the processing comprising: segmenting the initial video frame to generate a segmented video frame; generating a plurality of stylized video frames each according to a respective one of the style images; and generating a final video frame comprising, for each segment of the segmented video frame: determining a stylized video frame, extracting the respective segment from the determined stylized video frame, and inserting the extracted segment into the final video frame; and combining each generated final video frame in sequence to generate the final video.

11 Claims, 7 Drawing Sheets

(56) References Cited

U.S. PATENT DOCUMENTS

| | | | | |
|---|---|---|---|---|
| 2006/0050971 | A1* | 3/2006 | Page | H04N 19/436 375/E7.181 |
| 2006/0171453 | A1* | 8/2006 | Rohlfing | G08B 13/19632 348/E7.086 |
| 2006/0255931 | A1* | 11/2006 | Hartsfield | G08B 13/19656 348/E7.086 |
| 2007/0098288 | A1* | 5/2007 | Raskar | G06T 7/12 382/254 |
| 2008/0247654 | A1* | 10/2008 | Morikawa | H04N 19/59 386/E5.072 |
| 2010/0220794 | A1* | 9/2010 | Zhou | H04N 19/16 375/E7.02 |
| 2010/0245382 | A1* | 9/2010 | Sio | H04N 5/272 345/593 |
| 2018/0061459 | A1* | 3/2018 | Song | H04N 21/812 |
| 2019/0026870 | A1* | 1/2019 | Hu | G06T 5/50 |
| 2019/0236814 | A1* | 8/2019 | Shlens | G06T 11/00 |
| 2019/0279075 | A1* | 9/2019 | Liu | G06N 3/084 |
| 2019/0279681 | A1* | 9/2019 | Yuan | G06V 20/64 |
| 2020/0074709 | A1* | 3/2020 | Bhat | G06N 7/005 |
| 2020/0074722 | A1* | 3/2020 | Li (Lee) | G06T 15/503 |
| 2020/0090701 | A1* | 3/2020 | Xu | H04N 21/4532 |
| 2020/0105029 | A1* | 4/2020 | Jung | G06T 5/50 |
| 2020/0258204 | A1* | 8/2020 | Fang | G06T 3/0012 |
| 2020/0273494 | A1* | 8/2020 | Mee | G11B 27/031 |
| 2020/0286213 | A1* | 9/2020 | Unger | H04N 1/4072 |
| 2021/0110164 | A1* | 4/2021 | Mehta | G06V 10/25 |
| 2021/0158080 | A1* | 5/2021 | Price | G02B 27/017 |
| 2021/0209464 | A1* | 7/2021 | Bala | G06N 3/08 |

OTHER PUBLICATIONS

Canny, "A Computational Approach to Edge Detection," IEEE Trans Pattern Anal Mach Intell., Jun. 1986, 21 pages.

Mobahi et al., "Segmentation of Natural Images by Texture and Boundary Compression," International Journal of Computer Vision, Jul. 2010, 21 pages.

Pal et al., "A Review on Image Segmentation Techniques," Pattern Recognition, Mar. 1993, 26(9):1277-1294.

* cited by examiner

FILM-MAKING USING STYLE TRANSFER

CROSS-REFERENCE TO RELATED APPLICATIONS

This applications claims priority to Provisional Patent Application No. 62/961,117, entitled "Film-Making Using Style Transfer," filed on Jan. 14, 2020, the entire contents of which are hereby incorporated by reference.

BACKGROUND

This specification relates to applications of neural networks, and more particularly to techniques of using neural networks to apply style transfer in film making.

In general, style transfer refers to a process of modifying one image to take on style elements of a second image while still preserving its content. In many cases, style transfer is performed using neural networks.

Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the neural network thus involves continually performing a forward pass on the input, computing gradient values, and updating the current values for the set of parameters for each layer using the computed gradient values. Once a neural network is trained, the final set of parameter values can be used to make predictions in a production system.

SUMMARY

This specification describes how a computer system can generate a video composed of a sequence of video frames, where each video frame is generated using a style transfer system.

In a first embodiment, the style transfer system receives an initial video composed of a sequence of initial video frames and generates a final video composed of a sequence of final video frames, where each final video frame depicts the content of a respective initial video frame in a composite of styles.

In particular, for each initial video frame, the system can generate multiple stylized video frames, each according to a respective style image, by processing the initial video frame and the respective style image using a style transfer neural network. The stylized video frames depict the content of the initial video frame in the style of the respective style image.

The style transfer system can also generate a segmented video frame by segmenting the initial video frame. For each segment of the segmented video frame, the style transfer system can determine a particular stylized video frame. The style transfer system can then generate a final video frame by extracting each segment from the respective determined stylized video frame and inserting the extracted segment into the final video frame. That is, the final video frame depicts the same content as the initial video frame, but each segment of the final video frame has the style of a respective style image.

After processing each initial video frame to generate a respective final video frame, the style transfer system can generate a final video by combining each final video frame in sequence.

In a second embodiment, the style transfer system receives an initial video composed of a sequence of initial video frames, and generates a final video composed of a sequence of final video frames, where each final video frame depicts the content of a respective initial video frame, while a particular object depicted in the initial video frame is depicted in the final video frame in a particular style. The particular style of the particular object is determined based on the size of the particular object in the initial video frame.

In particular, for each initial video frame, the style transfer system detects the particular object of interest in the initial video frame, and determines a size of the object. The style transfer system can select a particular style image based on the size of the object in the initial video frame. The style transfer system can then generate a stylized object image by processing the initial video frame and the selected style image using a style transfer neural network. The stylized object image depicts the particular object of interest in the style of the selected style image. The style transfer system can then generate a final video frame by inserting the stylized object image into the initial video frame.

As before, after processing each initial video frame to generate a respective final video frame, the style transfer system can generate a final video by combining each final video frame in sequence.

Particular embodiments of the subject matter described in this specification can be implemented so as to realize one or more of the following advantages.

In some existing solutions, if a user wishes to generate a stylized video that is a composite of multiple styles, then a user should manually generate, for each initial video frame, multiple stylized video frames. The user should then manually select, for each pixel in the initial video frame, which generated stylized video frame the pixel should be extracted from. For example, the user can manually extract particular portions of each stylized video frame and piece the extracted portions together. This process is time consuming for a single video frame, and the time required increases linearly with each video frame in the initial video. Using techniques described in this specification, a user can automate the process and generate a final stylized video significantly more quickly.

Some embodiments described in this specification allow a user to quickly and inexpensively capture initial videos that by themselves would not be suitable for release, and generate a final video that appears as if the video frames were animated by hand by an artist. When capturing the initial video, the user can use cheap costumes, puppets, and props. Then, for the segments of a given video frame that have low production value, the user can then select particular style images that cause the segments to appear high-quality, thus generating a final video frame that is aesthetically pleasing.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a computer system can generate a video composed of a sequence of video frames, where each video frame is generated using a style transfer system.

Figure 1A:
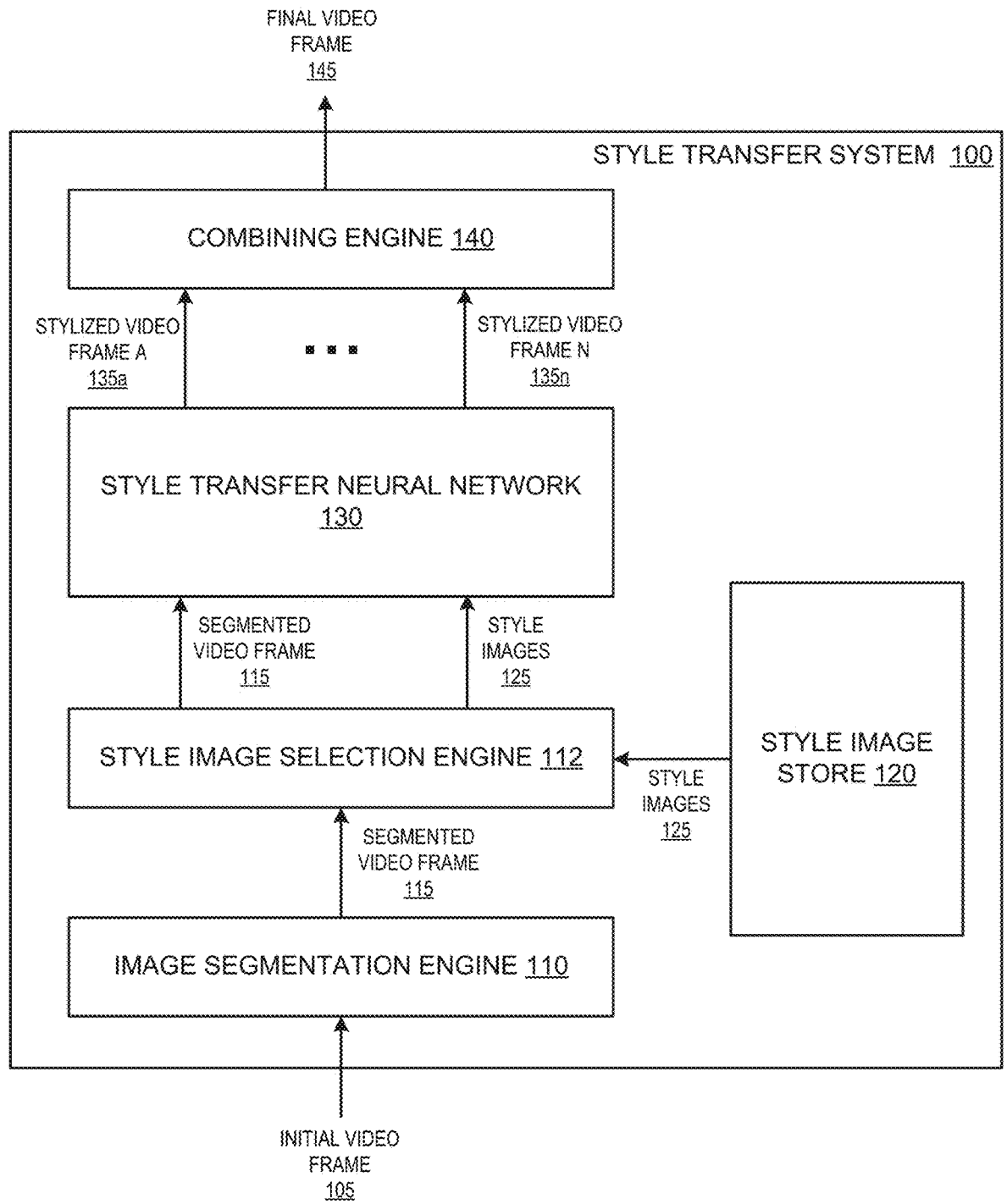
FIG. 1A shows an example style transfer system.

FIG. 1A shows an example style transfer system 100. The style transfer system 100 includes an image segmentation engine 110, a style image selection engine 112, a style image store 120, a style transfer neural network 130, and a combining engine 140. The style transfer system 100 is an example of a system implemented as computer programs on one or more computers in one or more locations in which the systems, components, and techniques described below are implemented.

The style transfer system 100 takes as input an initial video frame 105. The initial video frame 105 can be a frame of a video captured using any appropriate device. As a particular example, the video can be captured by a video camera, e.g. a camcorder or a smartphone camera.

The image segmentation engine 110 receives the initial video frame 105 as input, and generates a segmented video frame 115. The segmented video frame 115 characterizes the initial video frame 105 segmented into multiple segments, where each segment characterizes a different object that is depicted in the initial video frame 105. In particular, the segmented video frame 115 can include the initial video frame 105 where each pixel of the initial video frame 105 has been assigned to a particular segment.

As a particular example, the image segmentation engine 110 can use a clustering algorithm to generate the segmented video frame 115. A clustering algorithm is an algorithm that receives an image and generates multiple clusters of the pixels of the image, where each pixel is assigned a particular cluster. For example, the image segmentation engine 110 can use a k-means clustering technique, where pixels of the initial video frame 105 are each assigned to one of k segments according to the their "distance" in a color space, e.g. the RGB color space. In some such implementations, some of the segments of the segmented video frame 115 can be discontinuous, i.e., a segment can include a first pixel and a second pixel such that there does not exist a path between the first pixel and the second pixel that only includes other pixels in the segment.

As another particular example, the image segmentation engine 110 can use a motion-based segmentation technique to generate the segmented video frame 115. That is, the image segmentation engine 110 can identify differences between the initial video frame 105 and a previous video frame in the sequence of video frames. These differences can correspond to depictions of objects that are in motion. For example, the image segmentation engine 110 can use a technique similar to the existing techniques described in "Motion-based Segmentation and Region Tracking in Image Sequences," Badenas et al., DOI: 10.1016/S0031-3203(00)00014-5.

As another particular example, the image segmentations engine 110 can use a compression-based technique to generate the segmented video frame 115. Compression-based techniques aim to find a segmentation of an image that minimizes the coding length of the image, where the coding length of an image is the size, in bytes, of the image after it has been compressed. For example, the image segmentation engine 110 can use a technique similar to the existing techniques described in "Segmentation of Natural Images by Texture and Boundary Compression," Mobahi et al., DOI: 10.1007/s11263-011-0444-0.

As another particular example, the image segmentation engine 110 can use an edge detection algorithm to generate the segmented video frame 115. An edge detection algorithm is one that receives an image and determines points in the image that characterize the edges of objects or shapes depicted in the image. For example, the image segmentation engine 110 can use a Canny edge detector to determine the edges of objects depicted in the initial video frame 105 ("A Computational Approach to Edge Detection," Canny, DOI: 10.1109/TPAMI.1986.4767851).

As another particular example, the image segmentation engine 110 can use a region-growing technique to generate the segmented video frame 115. Region-growing techniques iteratively compare neighboring pixels against a similarity criterion; if the neighboring pixels satisfy the criterion, then they are determined to belong to the same segment. Thus, segments "grow" as new pixels are compared to pixels in a segment and are added to the segment. For example, the image segmentation engine 110 can use a technique similar to the existing techniques described in "A Review on Image Segmentation Techniques," Pal et al., DOI: 10.1016/0031-3203(93)90135-J.

The style image selection engine 112 receives the segmented video frame 115 as input. The style image selection engine 112 determines a selection of style images 125 to retrieve from the style image store 120; in particular, the style image selection engine 112 selects a style image from the style image store 120 for each segment of the segmented video frame 115. The style image store 120 stores a library of style images that can be processed by the style transfer neural network 130 to generate images that are in the style of a respective style image. The style image selection engine 112 can select the same style image for multiple segments of the segmented video frame 115.

In some implementations, the selection of style images 125 can be selected by a user of the style transfer system 100. That is, the style image selection engine 112 can receive data characterizing the selection of style images 125 from a user device. In some such implementations, the user can select a respective style image for each segment of the video frame 115. In some other such implementations, the user can select the selection of style images 125 without assigning each segment to a respective style image, and the style image selection engine 112 can assign each segment of the segmented video frame 115 to a particular style image in the selection of style images 125.

In some other implementations, the style image selection engine 112 can select the selection of style images 125 according to one or more characteristics of the segmented video frame 115.

As a particular example, the style transfer neural network 130 can generate a classification for the segmented video frame 115, e.g. using a trained image classification neural network that is configured to process an image to generate a classification output that includes a respective score corresponding to each of multiple categories. The score for a category indicates a likelihood that the image belongs to the category. In some cases, the categories may be classes of objects (e.g., dog, cat, person, and the like), and the image may belong to a category if it depicts an object included in the object class corresponding to the category. In some cases, the categories may represent global image properties (e.g., whether the image depicts a scene in the day or at night, or whether the image depicts a scene in the summer or the winter), and the image may belong to the category if it has the global property corresponding to the category. The style image selection engine 112 can select style images according to one or more generated classifications of the segmented video frame 115. For example, the style image store 120 might include a particular selection of style images for video frames classified as "day," and a different particular selection of style images for video frames classified as "night."

As another particular example, the style transfer neural network 130 can recognize an object in each segment of the segmented image 115, e.g. using a trained object recognition neural network that is configured to process an image to generate a recognition score corresponding to each of multiple classes of objects. The score for a category indicates a likelihood that the image depicts an object of the given class. The style image selection engine 112 can select a respective style image for each segment according to the recognized object in the segment. For example, the style image store 120 might include a dictionary that maps each object class to a selected style image.

The style image selection engine 112 provides the segmented video frame 115 and the selection of style images 125 as input to the style transfer neural network 130. The style transfer neural network 130 is configured to process a content image and a style image to generate a stylized image that depicts the content of the content image in the style of the style image.

In some implementations, the style transfer neural network 130 includes a pretrained convolutional neural network (CNN) that has been trained to receive an image and to process the image to perform a different task than style transfer. For example, the CNN can be a trained object recognition neural network. As another example, the CNN can be a trained image classification neural network. The CNN includes multiple convolutional neural network layers that each receive as input a representation of the image generated by a previous convolutional neural network layer, and process the input representation to generate a new representation of the image. The generated representation is also called the "activation" of the given convolutional neural network layer.

In particular, the style transfer neural network 130 can define the "content" $C(i)$ of an input image i to be the activation of a particular 'late' convolutional neural network layer that is late in the sequence of layers of the CNN. The style transfer neural network 130 can define the "style" $S(i)$ of an input image i to be a combination of the activations one or more 'early' or 'middle' convolutional neural network layers that are early in the sequence or in the middle of the sequence of layers of the CNN. In some implementations, the style transfer neural network 130 can combine the style activations using a Gramian matrix.

At each of multiple iterations, the style transfer neural network 130 can process the input content image p, the input style image a, and the current iteration of the generated stylized image g using the CNN. In some implementations, the style transfer neural network 130 can generate the initial generated stylized image by adding random noise to the content image. The style transfer neural network 130 can then calculate a loss function L that characterizes i) how similar the content of the generated stylized image g is to the content image p and ii) how similar the style of the generates stylized image g is to the style image a. As a particular example, the style transfer neural network 130 can use the following loss function: $L(g)=|C(g)-C(p)|+k|S(g)-S(a)|$, where $|\cdot|$ is the $L^2$ distance and k is a hyperparameter that controls the relative importance of content vs. style. The style transfer neural network 130 can then update the current iteration of the stylized image g using the computes loss $L(g)$, e.g. using gradient descent. After several iterations, e.g. 100 or 1000 iterations, the generated stylized image g can depict the content of the content imagep in the style of the style image a, and the style transfer neural network 130 can output the final generated style image g.

Referring back to FIG. 1A, the style transfer neural network 130 processes the segmented video frame 115 and each of the style images 125 to generate N stylized video frames 135*a-n*.

In some implementations, the style transfer neural network 130 generates a stylized video frame for each style image, where each stylized video frame depicts the content of the entire segmented video frame 115. That is, for each respective style image in the selection of style images 125, the style transfer neural network 130 generates a stylized video frame by processing i) every pixel of the segmented video frame 115 as the content image, and ii) the respective style image as the style image.

In some other implementations, the style transfer neural network 130 generates a stylized video frame for each segment of the segmented video frame 115, where each stylized video frame depicts the content of the respective segment. That is, for each segment of the segmented video frame 115, the style transfer neural network 130 generates a stylized video frame by processing i) the pixels in the segmented video frame that belong to the segment as the content image, and ii) the style image in the selection of style images 125 corresponding to the segment as the style image.

The combining engine 140 receives the N stylized video frames 135*a-n* as input, and combines them to generate a final video frame 145.

In the cases where the style transfer neural network 130 generated a stylized video frame for each style image in the selection of style images 125, the combining engine can extract, for each segment in the segmented video frame 115, the segment from the stylized video frame that was generated using the style image that corresponds to the segment in the selection of style images 125. That is, for each particular segment and corresponding style image selected by the style image selection engine 112, the combining engine 140 can extract particular pixels from the stylized video frame generated using the corresponding style image, where the particular pixels are those pixels that are in the same position in the stylized video frame as the pixels in the segmented video frame that are classified as belonging to the particular segment. After extracting each segment from the appropriate stylized video frame, the combining engine 140 can combine the segments to generate the final video frame 145, where each segment is in the same respective location in the final video frame 145 as it was in the segmented video frame 115.

In the cases where the style transfer neural network 130 generated a stylized video frame for each segment in the segmented video frame 115, the combining engine 140 can combine the segments to generate the final video frame 145, where each segment is in the same respective location in the final video frame 145 as it was in the segmented video frame 115.

The style transfer system 100 can process each of a sequence of initial video frames 105 that compose an initial video, generating a corresponding sequence of final video frames 145 that can be combined to generate a final video.

Figure 1B:
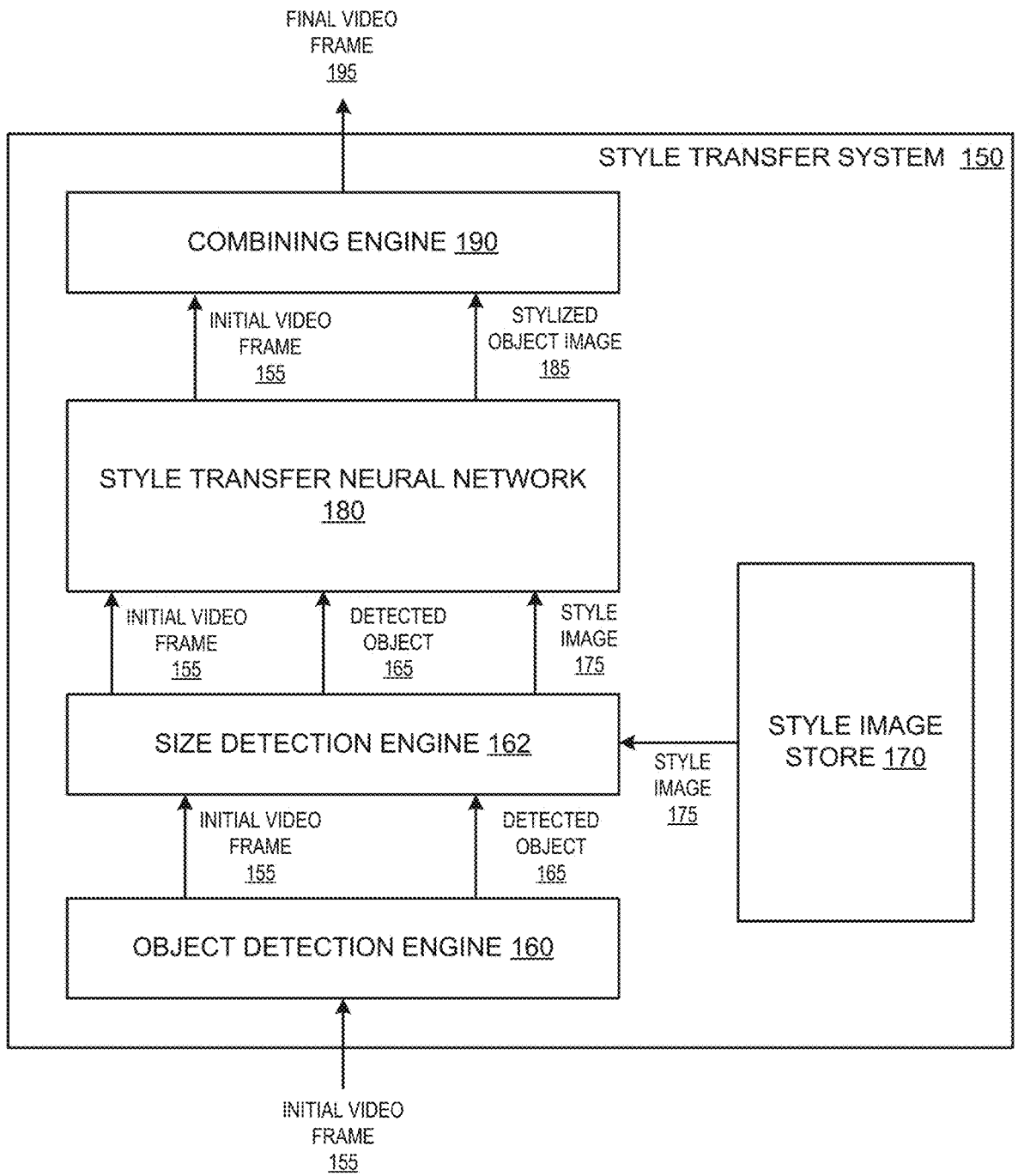
FIG. 1B shows another example style transfer system.

FIG. 1B shows another example style transfer system 150. The style transfer system 150 includes an object detection engine 160, a size detection engine 162, a style image store 170, a style transfer neural network 180, and a combining engine 190. The style transfer system 150 is an example of a system implemented as computer programs on one or more computers in one or more locations in which the systems, components, and techniques described below are implemented.

The style transfer system 150 takes as input an initial video frame 155. As before, the initial video frame 155 can be a frame of a video captured using any appropriate device.

The object detection engine 160 receives the initial video frame 155 as input and processes the initial video frame 155 to detect an object of a particular type in the initial video frame 155. The object detection engine 160 outputs a detected object 165, which identifies a location of the object of interest in the initial video frame 155. In one example, the object detection engine 160 can include a machine learning model that is configured to process an image to generate a bounding box of a location of the object of interest in the image. That is, the detected object 165 is data characterizing a bounding box that surrounds the object of interest in the initial video frame 155. As another example, the object detection engine 160 can include a machine learning model that is configured to process an image to generate a pixel-level detection output that includes, for each pixel, a respective determination of whether the pixel depicts the object of interest. That is, the detected object 165 is data characterizing a selection of pixels of the initial video frame 155 that depict the object of interest.

The size detection engine 162 receives as input the initial video frame 155 and the detected object 165, and determines a size of the object of interest in the initial video frame 155. In some implementations, the size detection engine 162 determines a number or proportion of pixels in the initial video frame 155 that depict the object of interest. For example, if the detected object 165 characterizes a bounding box surrounding the object of interest in the initial video frame 155, the size detection engine 162 can determine a number or proportion of pixels in the initial video frame 155 that are inside the bounding box. As another example, if the detected object 165 characterizes a selection of the pixels of the initial video frame 155 that depict the object of interest, the size detection engine 162 can determine a number or proportion of pixels in the initial video frame 155 that are in the selection of pixels.

The size detection engine can then select a style image 175 in the style image store 170 based on the determined size of the object of interest in the initial video frame 155. As before, the style image store 170 stores a library of style images that can be processed by the style transfer neural network 180 to generate images that are in the style of a respective style image. As a particular example, the size detection engine 162 can include a dictionary that maps sizes of the object of interest in an initial video frame to particular style images in the style image store 170. For example, a first particular style image can be selected when the object of interest is between 0 and 99 pixels large, a second particular style image can be selected when the object of interest is between 100 and 199 pixels large, etc. The size detection engine 162 can then retrieve the style image 175 from the style image store 170.

The size detection engine 162 provides the initial video frame 155, the detected object 165, and the style image 175 as input to the style transfer neural network 180. As before the style transfer neural network 180 is configured to process a content image and a style image to generate a stylized image that depicts the content of the content image in the style of the style image.

The style transfer neural network 180 processes the initial video frame 155 and the style image 175 to generate a stylized object image 185 that depicts the object of interest in the style of the style image 175.

In some implementations, the style transfer neural network 180 processes the entire initial video frame 155 as the content image, along with the style image 175 as the style image, to generate a stylized video frame that depicts the content of the entire video frame 155 in the style of the style image 175. The style transfer neural network 180 can then process the generated stylized video frame using the detected object 165 to extract the pixels that depict the object of interest. For example, if the detected object is a selection of pixels of the initial video frame 155 that depict the object of interest, then the style transfer neural network 180 can select the corresponding pixels in the generated stylized video frame to be the stylized object image 185.

In some other implementations, the style transfer neural network 180 processes only the pixels in the initial video frame 155 that depict the object of interest as the content image, along with the style image 185 as the style image, to generate the stylized object image. For example, if the detected object 165 is a selection of pixels of the initial video frame 155 that depict the object of interest, then the style transfer neural network 180 can process only those pixels of the initial video frame 155 as the content image. As another example, if the detected object 165 characterizes a bounding box surrounding the object of interest in the initial video frame 155, then the style transfer neural network 180 can process only the pixels of the initial video frame 155 that are inside the bounding box as the content image.

The combining engine 190 receives the stylized object image 185 and the initial video frame 155, and combines them to generate a final video frame 195. As a particular example, the combining engine can superimpose the stylized object image 185 onto the initial video frame 155 to generate the final video frame 195 so that the final video frame 195 is the same as the initial video frame 155 except that the object of interest is depicted in the style of the style image 175. That is, the combining engine can replace those pixels in the initial video frame 155 that have corresponding pixels in the stylized object image 185 with the corresponding pixels.

The style transfer system 150 can process each of a sequence of initial video frames 155 that compose an initial video, generating a corresponding sequence of final video frames 195 that can be combined to generate a final video. That is, the object of interest in the each of the final video frames of the final video is depicted in the style of a particular style image according to the size of the object of interest in the corresponding initial video frame.

Figure 2A:
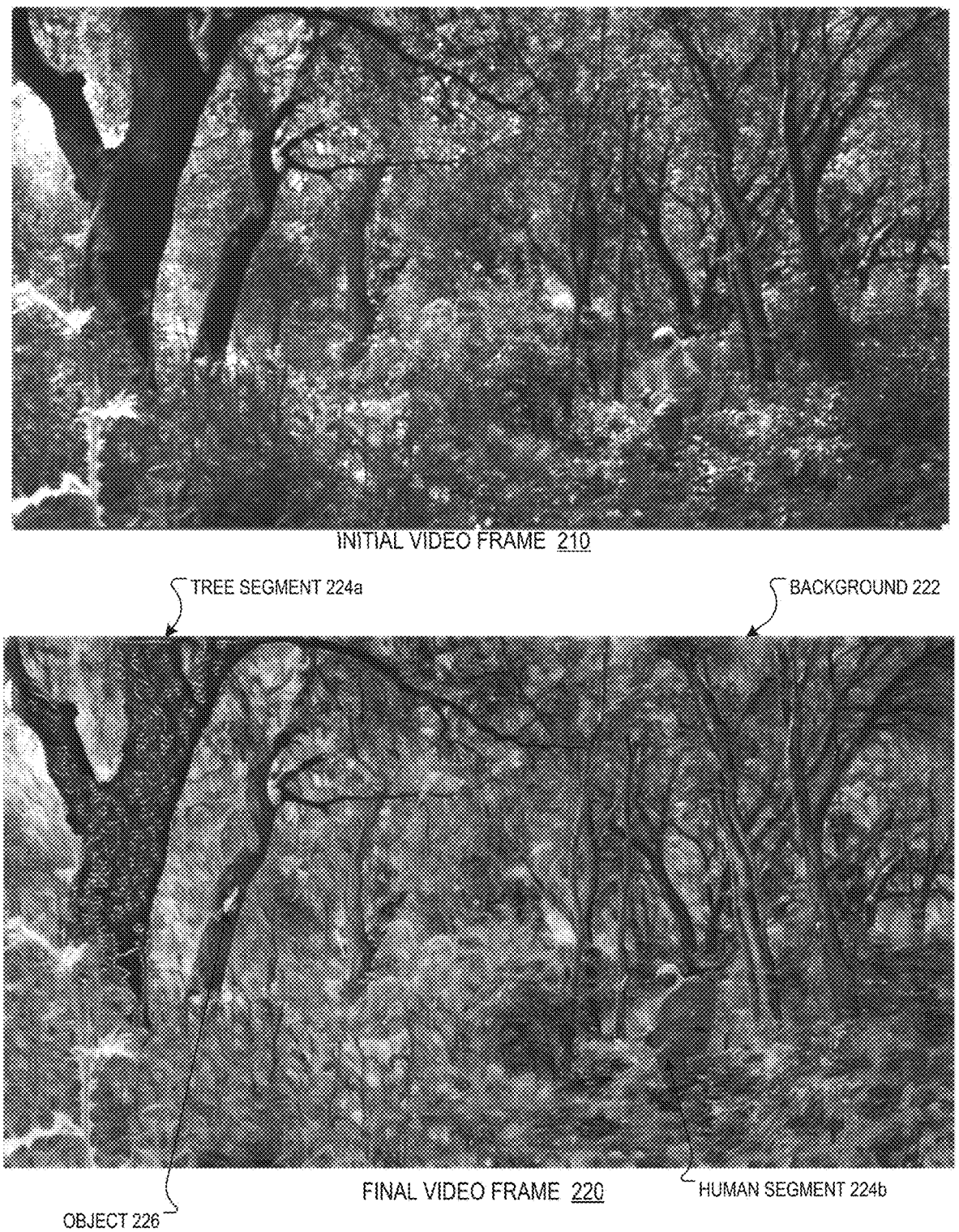
FIG. 2A shows an example initial video frame and an example final video frame.

FIG. 2A shows an example initial video frame 210 and an example final video frame 220. The initial video frame 210 is a frame of a video that has been captured using any appropriate video recording device. The final video frame 220 is the output generated by a style transfer system, e.g. the style transfer system 100 depicted in FIG. 1A, when the style transfer system processes the initial video frame 210.

Figure 2B:
FIG. 2B shows example style images and example stylized video frames.
Figure 2B:
Figure 2B:
Figure 2B:
Figure 2B:
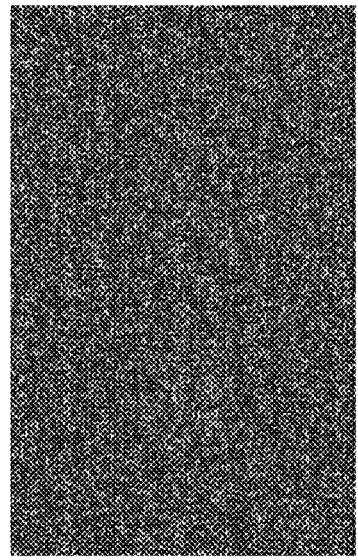
Figure 2B:
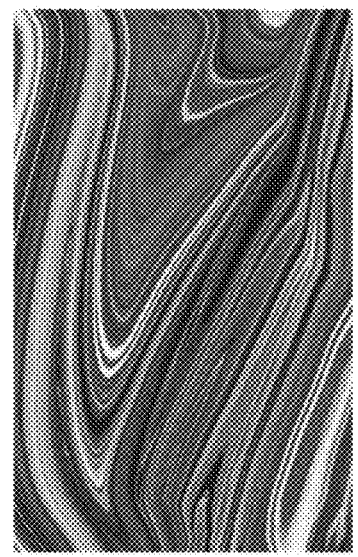

FIG. 2B shows example style images 230a-c and corresponding example stylized video frames 240a-c. Each respective stylized video frame 240 is an example output generated by a style transfer neural network e.g. the style transfer neural network 130 depicted in FIG. 1A, when the style transfer neural network processes the corresponding style image, along with the initial video frame 210 depicted in FIG. 2A as the content image.

Referring to FIGS. 2A and 2B together, the final video frame 220 is an example output generated by a style transfer system after processing the style images 230a-c and the initial video frame 210. In particular, the background 222 of the final video frame 220 is depicted in the style of the first style image 230a, a tree segment 224a depicting a tree in the foreground of the final video frame 220 is depicted in the style of the second style image 230b, and a human segment 224b depicting the human in the final video frame 220 is depicted in the style of the third style image 230c.

As a particular example, an image segmentation engine of the style transfer system, e.g. the image segmentation engine 210 depicted in FIG. 1A, might have generated three segments of the initial video frame 210: the background segment, the segment depicting the human, and the segment depicting the tree. Then, a style image selection engine of the style transfer system, e.g. the style image selection engine 212 depicted in FIG. 1A, might have selected the first style image 230a to correspond to the background segment, the second style image 230b to correspond to the tree segment, and the third style image 230c to correspond to the human segment. A style transfer neural network of the style transfer system, e.g. the style transfer neural network 130 depicted in FIG. 1A, could then have generated each of the stylized video frames 240a-c using the respective style images 230a-c. A combining engine of the style transfer system, e.g. the combining engine 140 depicted in FIG. 1A, could then have generated the final video frame 220 by extracting the background segment 222 from the first stylized video frame 240a, the tree segment 224a from the second stylized video frame 240b, and the human segment 224b from the third stylized video frame 240c.

An object 226 has also been added to the final video frame 220. The object 226 was digitally added to the initial video frame 210 before processing the initial video frame 210 with any corresponding style images using the style transfer neural network. This process is described in more detail below in reference to FIG. 3A.

Figure 3A:
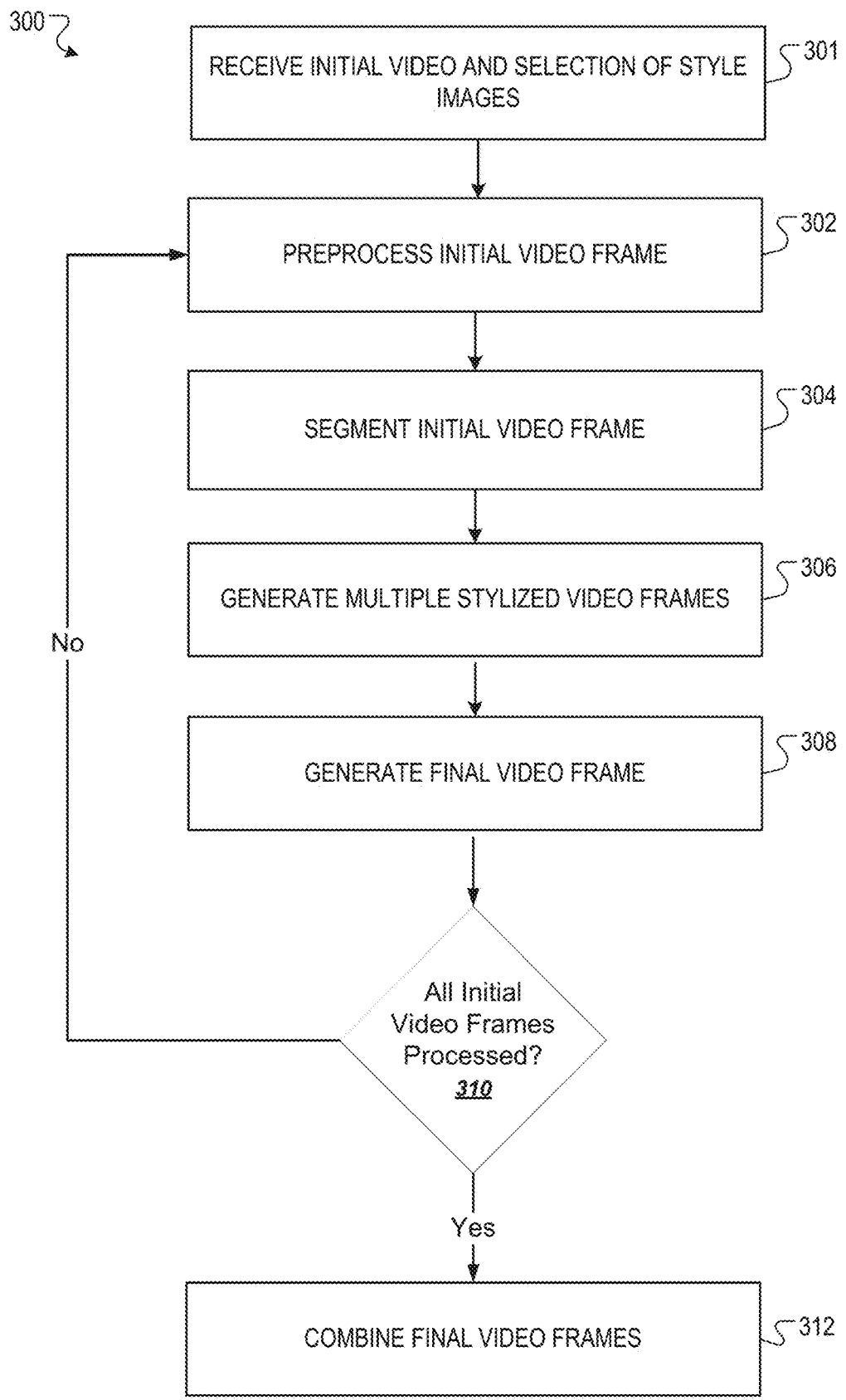
FIG. 3A is a flow diagram of an example process for generating a final video.

FIG. 3A is a flow diagram of an example process 300 for generating a final video. For convenience, the process 300 will be described as being performed by a system of one or more computers located in one or more locations. For example, a style transfer system, e.g., the style transfer system 100 depicted in FIG. 1A, appropriately programmed in accordance with this specification, can perform the process 300.

The system receives an initial video composed of a sequence of initial video frames, and a selection of style images (step 301). In some implementations, the selection of style images is provided by a user of the system. In some other implementations, the selection of style images is determined by an external system that is configured to process the initial video and generate a selection of style images.

The system preprocesses an initial video frame in the sequence of initial video frames (step 302). For example, the system can apply a filter to the initial video frame, e.g. a filter that blurs the initial video frame or a filter that adds grain to the initial video frame. As another example, the system can digitally remove puppet strings of a puppet that is depicted in the initial video frame. As another example, the system can digitally insert one or more CGI objects into the initial video frame, e.g. the object 226 inserted into the video frame 220 depicted in FIG. 2A. As another particular example, the system can drop the initial video frame. That is, the system can preprocess the initial video by dropping the frame rate of the initial video, i.e. dropping one or more initial video frames in the sequence of initial video frames.

The system segments the initial video frame to generate a segmented video frame (step 304). For example, the system can use i) a motion-based segmentation algorithm, ii) a clustering algorithm, iii) an edge detection algorithm, iv) a compression-based algorithm, and/or v) a region-growing algorithm to segment the initial video frame.

The system generates multiple stylized video frames, each according to a respective style images in the selection of style images (step 306). The system generates each stylized video frame by processing the segmented video frame and a respective style image using a style transfer neural network.

In some implementations, for each style image, the system processes the entire segmented video frame and the style image using the style transfer neural network to generate a stylized video frame depicting the entire segmented video frame in the style of the style image.

In some other implementations, for each style image and for each particular segment of the segmented video frame, the system processes the particular segment and the style image using the style transfer neural network to generate a stylized video frame depicting the particular segment in the style of the style image.

In some other implementations, for each particular segment of the segmented video frame, the system determines a single corresponding style image and processes the particular segment and the determined corresponding style image using the style transfer neural network to generate a stylized video frame depicting the particular segment in the style of the determined corresponding style image.

The system generates a final video frame (step 308).

For each segment of the segmented video frame, the system determines a stylized video frame. In some implementations, the system receives the determination from a user of the system. In some other implementations, the system determines the stylized video frame by processing the segment of the segmented video frame using a machine learning model configured to process an image and generate a selection of a particular stylized video frame.

In those implementations where each particular segment was processed with a single determined corresponding style image to generate the stylized video frames, the system determines the stylized video frame for a particular segment to be the stylized video frame that depicts the content of the particular segment in the style of the determined corresponding style image.

The system can then extract each respective segment from the corresponding determined stylized video frame, and insert the extracted segment into the final video frame.

The system determines whether all initial video frames in the sequence of initial video frames have been processed to generate corresponding final video frames (step 310). If there are initial video frames that have not been processed, the system selects an unprocessed initial video frame and returns to step 302.

If all video frames have been processed, the system combines each generated final video frame (step 312). The system combines the final video frames in the same sequence as the sequence of initial video frames in the initial video, thereby generating a final video composed of the sequence of final video frames.

Figure 3B:
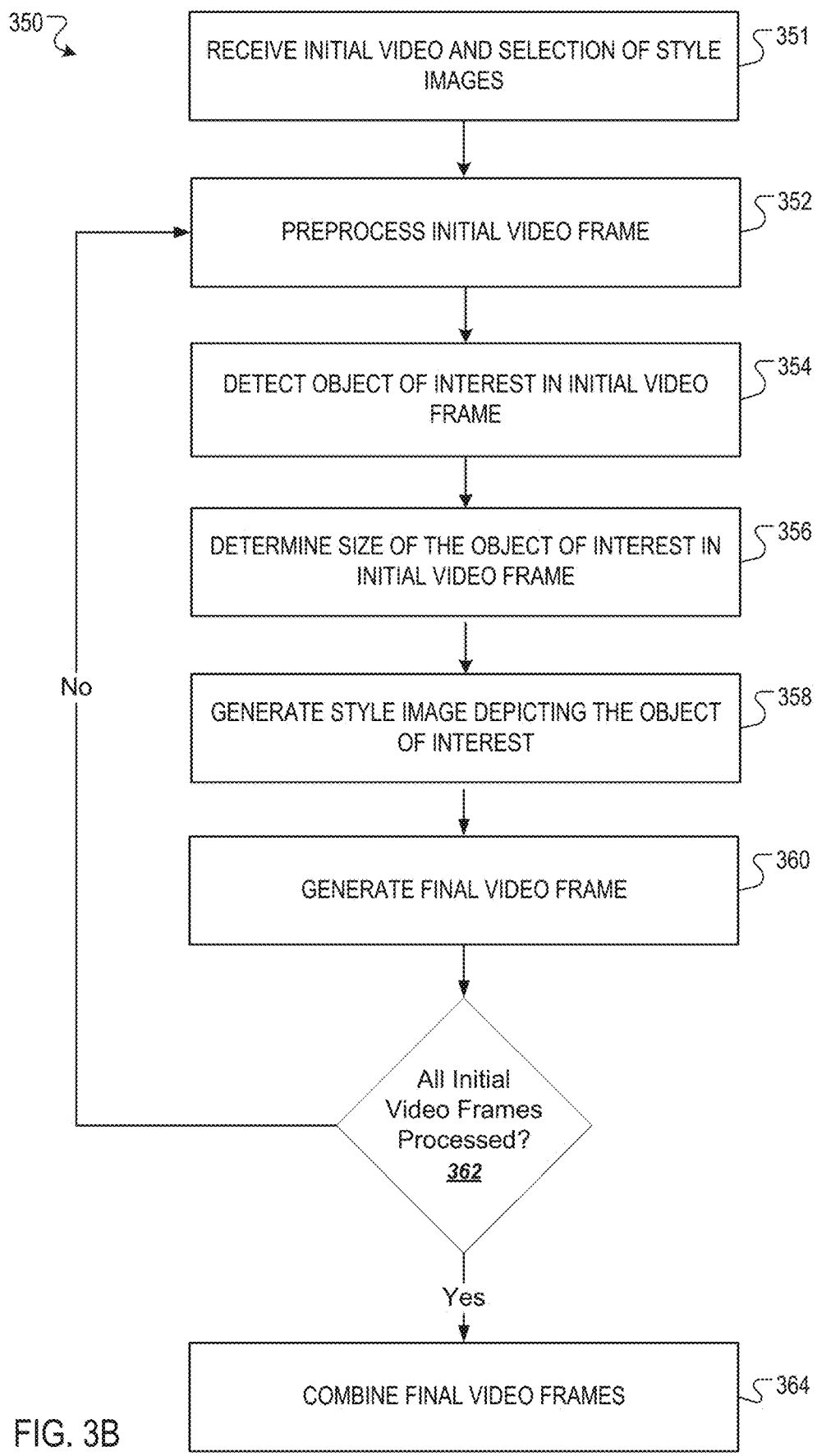
FIG. 3B is a flow diagram of another example process for generating a final video.

FIG. 3B is a flow diagram of another example process 350 for generating a final video. For convenience, the process 350 will be described as being performed by a system of one or more computers located in one or more locations. For example, a style transfer system, e.g., the style transfer system 150 depicted in FIG. 1B, appropriately programmed in accordance with this specification, can perform the process 350.

The system receives an initial video composed of a sequence of initial video frames, and a selection of style images (step 351). As before, in some implementations the selection of style images is provided by a user of the system, while in some other implementations the selection of style images is determined by an external system that is configured to process the initial video and generate a selection of style images.

The system preprocesses an initial video frame in the sequence of initial video frames (step 352). For example, the system can apply a filter to the initial video frame, e.g. a filter that blurs the initial video frame or a filter that adds grain to the initial video frame. As another example, the system can digitally remove puppet strings of a puppet that is depicted in the initial video frame. As another example, the system can digitally insert one or more CGI objects into the initial video frame, e.g. the object 226 inserted into the video frame 220 depicted in FIG. 2A. As another particular example, the system can drop the initial video frame. That is, the system can preprocess the initial video by dropping the frame rate of the initial video, i.e. dropping one or more initial video frames in the sequence of initial video frames.

The system detects an object of interest in the initial video frame (step 354). For example, the system can process the initial video frame using a machine learning model that is configured to receive an image and generate a bounding box of a location of the object of interest in the image. As another example, the system can process the initial video frame using a machine learning model that is configured to process an image to generate an output that includes, for each pixel, a respective determination of whether the pixel depicts the object of interest.

The system determines a size of the object of interest in the initial video frame (step 356). In some implementations, the system determines a number and/or proportion of pixels in the initial video frame that depict the object of interest.

The system generates a style image depicting the object of interest in the style of a particular style image in the selection of style images (step 358). The system generates the style image by processing the initial video frame and the particular style image using a style transfer neural network. The system can select the particular style image based on the size of the object of interest. As a particular example, the system can maintain a dictionary that maps sizes of the object of interest to respective particular style images.

In some implementations, the system processes the entire initial video frame and the particular style image using the style transfer neural network to generate a stylized video frame that depicts the contents of the entire initial video frame in the style of the particular style image. Then, the system can extract the style image from the generated stylized video frame, e.g. by extracting the pixels of the stylized video frame that correspond to pixels in the initial video frame that were identified as depicting the object of interest in step 354.

In some other implementations, the system processes only a segment of the initial video frame that depicts the object of interest to generate the stylized object image, e.g., the system can only process pixels in the initial video frame that were identifies as depicting the object of interest in step 354.

The system generates a final video frame (step 360). The system can generate the final video frame by inserting the stylized image of the object of interest into the initial video frame.

The system determines whether all initial video frames in the sequence of initial video frames have been processed to generate corresponding final video frames (step 362). If there are initial video frames that have not been processed, the system selects an unprocessed initial video frame and returns to step 352.

If all video frames have been processed, the system combines each generated final video frame (step 364). The system combines the final video frames in the same sequence as the sequence of initial video frames in the initial video, thereby generating a final video composed of the sequence of final video frames.

Figure 4:
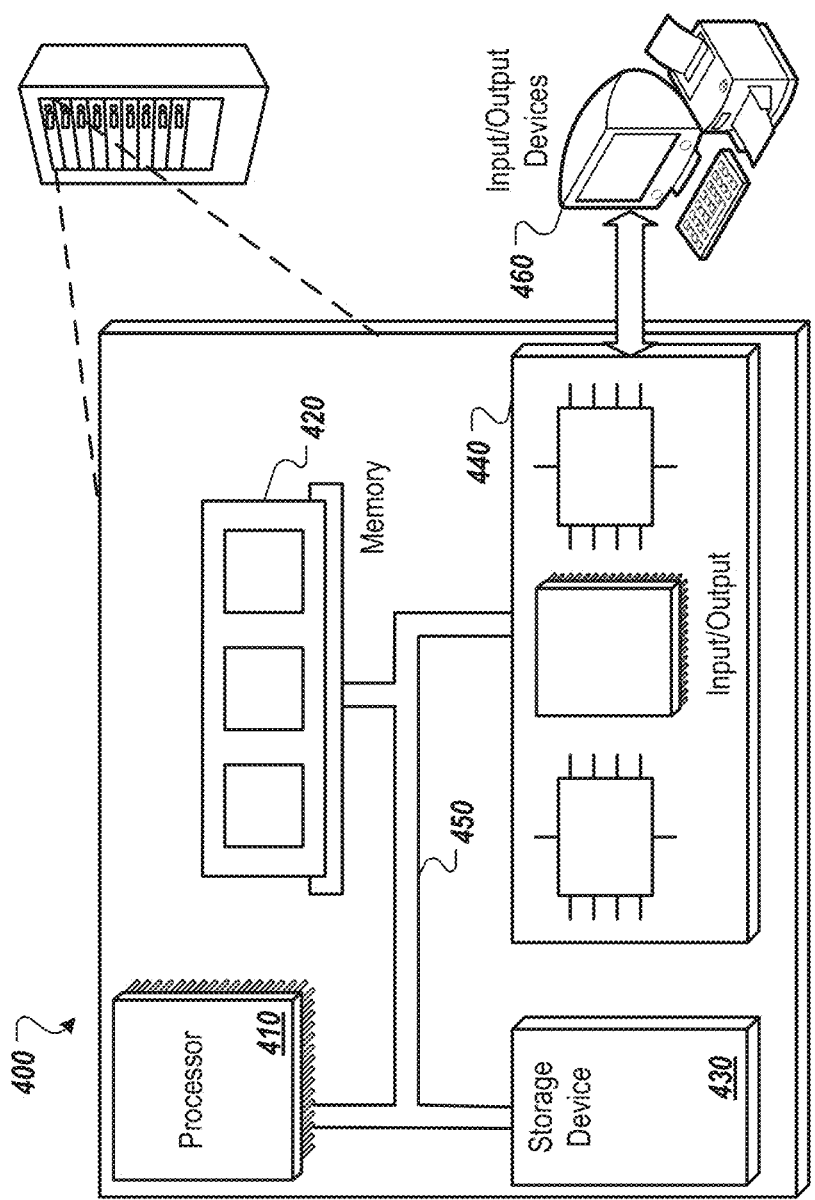
FIG. 4 is a block diagram of an example computer system.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (for example, a cloud storage device), or some other large capacity storage device.

The input/output device 440 provides input/output operations for the system 400. In one implementation, the input/output device 440 can include one or more network interface devices, for example, an Ethernet card, a serial communication device, for example, a RS-232 port, and/or a wireless interface device, for example, a 802.11 card. In another implementation, the input/output device can include driver devices configured to receive input data and send output data to other input/output devices, for example, keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method of generating a final video comprising a sequence of final video frames, the method comprising:
    receiving an initial video comprising a sequence of initial video frames;
    receiving a selection of style images from a library of style images;
    for each initial video frame in the sequence of initial video frames, processing the initial video frame to generate a final video frame, the processing comprising:
        segmenting the initial video frame to generate a segmented video frame;
        generating a plurality of stylized video frames each according to a respective one of the style images, wherein generating a stylized video frame comprises processing the segmented video frame and the respective style image using a style transfer neural network; and
        generating a final video frame comprising, for each segment of the segmented video frame:
            determining a stylized video frame,
            extracting the respective segment from the determined stylized video frame, and
            inserting the extracted segment into the final video frame; and combining each generated final video frame in sequence to generate the final video.

Embodiment 2 is the method of embodiment 1, further comprising, for each initial video frame in the sequence of initial video frames, preprocessing the initial video frame.

Embodiment 3 is the method of embodiment 2, wherein preprocessing an initial video frame comprises one or more of:
    applying a filter to the initial video frame,
    digitally removing puppet strings from the initial video frame,
    inserting one or more CGI objects into the initial video frame, or
    dropping the initial frame rate.

Embodiment 4 is the method of any one of embodiments 1-3, wherein segmenting the initial video frame comprises segmenting the initial frame using one or more of:
    a motion-based segmentation algorithm,
    a clustering algorithm,
    an edge detection algorithm,
    a compression-based algorithm, or
    a region-growing algorithm.

Embodiment 5 is the method of any one of embodiments 1-4, wherein processing the segmented video frame and the respective style image using a style transfer neural network comprises processing the entire segmented video frame using the style transfer neural network to generate a stylized video frame depicting the entire segmented video frame in a style of the respective style image.

Embodiment 6 is the method of any one of embodiments 1-4, wherein processing the segmented video frame and the respective style image using a style transfer neural network comprises processing a particular segment of the segmented video frame using the style transfer neural network to generate a stylized video frame depicting the particular segment in a style of the respective style image.

Embodiment 7 is a method of generating a final video comprising a sequence of final video frames, the method comprising:
    receiving an initial video comprising a sequence of initial video frames;
    for each initial video frame in the sequence of initial video frames, processing the initial video frame to generate a final video frame, the processing comprising:
        detecting an object of interest depicted in the initial video frame;
        determining a size of the object of interest in the initial video frame;
        selecting a style image based on the size of the object of interest;
        generating a stylized object image depicting the object of interest in a style of the selected style image, wherein generating stylized object image comprises processing the initial video frame and the selected style image using a style transfer neural network; and
        generating a final video frame by inserting the stylized object image into the initial video frame; and combining each generated final video frame in sequence to generate the final video.

Embodiment 8 is the method of embodiment 7, further comprising, for each initial video frame in the sequence of initial video frames, preprocessing the initial video frame.

Embodiment 9 is the method of embodiment 8, wherein preprocessing an initial video frame comprises one or more of:
 applying a filter to the initial video frame,
 digitally removing puppet strings from the initial video frame,
 inserting one or more CGI objects into the initial video frame, or
 dropping the initial frame rate.

Embodiment 10 is the method of any one of embodiments 7-9, wherein processing the initial video frame and the selected style image using a style transfer neural network comprises:
 processing the entire initial video frame using the style transfer neural network to generate a stylized video frame depicting the entire initial video frame in the style of the selected style image; and
 extracting the stylized object image from the generated stylized video frame.

Embodiment 11 is the method of any one of embodiments 7-9, wherein processing the initial video frame and the selected style image using a style transfer neural network comprises processing a segment of the initial video frame that depicts the object of interest to generate the stylized object image.

Embodiment 12 is a system comprising: one or more computers and one or more storage devices storing instructions that are operable, when executed by the one or more computers, to cause the one or more computers to perform the method of any one of embodiments 1 to 11.

Embodiment 13 is a computer storage medium encoded with a computer program, the program comprising instructions that are operable, when executed by data processing apparatus, to cause the data processing apparatus to perform the method of any one of embodiments 1 to 11.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method of generating a final video comprising a sequence of final video frames, the method comprising:
 receiving an initial video comprising a sequence of initial video frames;
 receiving a selection of style images from a library of style images;
 for each initial video frame in the sequence of initial video frames, processing the initial video frame to generate a final video frame, the processing comprising:
  segmenting the initial video frame to generate a segmented video frame, wherein the segmenting comprises characterizing the initial video frame into multiple segments where each segment characterizes a different object depicted in the initial video frame;
  generating a plurality of stylized video frames each according to a respective one of the style images, wherein generating a stylized video frame comprises processing the segmented video frame and the respective style image using a style transfer neural network; and
  generating a final video frame comprising, for each segment of the segmented video frame:
   selecting one of the stylized video frames,
   extracting a respective segment from the selected stylized video frame, and
   inserting the extracted segment into the final video frame; and
 combining each generated final video frame in sequence to generate the final video.

2. The method of claim 1, further comprising, for each initial video frame in the sequence of initial video frames, preprocessing the initial video frame.

3. The method of claim 2, wherein preprocessing an initial video frame comprises one or more of:
 applying a filter to the initial video frame,
 digitally removing puppet strings from the initial video frame,
 inserting one or more CGI objects into the initial video frame, or
 dropping the initial frame rate.

4. The method of claim 3, wherein segmenting the initial video frame comprises segmenting the initial frame using one or more of:
 a motion-based segmentation algorithm,
 a clustering algorithm,
 an edge detection algorithm,
 a compression-based algorithm, or
 a region-growing algorithm.

5. The method of claim 4, wherein processing the segmented video frame and the respective style image using a style transfer neural network comprises processing the entire segmented video frame using the style transfer neural network to generate a stylized video frame depicting the entire segmented video frame in a style of the respective style image.

6. The method of claim 4, wherein processing the segmented video frame and the respective style image using a style transfer neural network comprises processing a particular segment of the segmented video frame using the style transfer neural network to generate a stylized video frame depicting the particular segment in a style of the respective style image.

7. The method of claim 1, wherein processing the segmented video frame and the respective style image using a style transfer neural network comprises processing the entire segmented video frame using the style transfer neural network to generate a stylized video frame depicting the entire segmented video frame in a style of the respective style image.

8. The method of claim 1, wherein processing the segmented video frame and the respective style image using a style transfer neural network comprises processing a particular segment of the segmented video frame using the style transfer neural network to generate a stylized video frame depicting the particular segment in a style of the respective style image.

9. The method of claim 1, wherein segmenting the initial video frame comprises segmenting the initial frame using one or more of:
   a motion-based segmentation algorithm,
   a clustering algorithm,
   an edge detection algorithm,
   a compression-based algorithm, or
   a region-growing algorithm.

10. A system comprising one or more computers and one or more storage devices storing instructions that when executed by the one or more computers cause the one more computers to perform the operations of the respective method of claim 1.

11. One or more non-transitory computer storage media storing instructions that when executed by one or more computers cause the one more computers to perform the operations of the respective method of claim 1.

* * * * *